United States Patent
Lortz et al.

(10) Patent No.: US 7,374,787 B2
(45) Date of Patent: May 20, 2008

(54) STABILIZED, AQUEOUS SILICON DIOXIDE DISPERSION

(75) Inventors: Wolfgang Lortz, Waechtersbach (DE); Christoph Batz-Sohn, Hanau (DE); Gabriele Perlet, Grosskrotzenburg (DE); Werner Will, Gelnhausen (DE); Gerrit Schneider, Hanau (DE); Peter Neugebauer, Offenbach (DE)

(73) Assignee: Degussa AG, Duesseldorf (DE)

( * ) Notice: Subject to any disclaimer, the term of this patent is extended or adjusted under 35 U.S.C. 154(b) by 325 days.

(21) Appl. No.: 10/644,755

(22) Filed: Aug. 21, 2003

(65) Prior Publication Data

US 2004/0106697 A1 Jun. 3, 2004

Related U.S. Application Data

(60) Provisional application No. 60/405,739, filed on Aug. 26, 2002.

(30) Foreign Application Priority Data

Aug. 22, 2002 (DE) ................. 102 38 463

(51) Int. Cl.
  *A23L 2/70* (2006.01)
  *C12H 1/00* (2006.01)
(52) U.S. Cl. ................ 426/422; 426/423; 426/330.3; 426/330.4; 106/483
(58) Field of Classification Search ................ 426/422, 426/423, 330.3, 330.4; 106/483
  See application file for complete search history.

(56) References Cited

U.S. PATENT DOCUMENTS

| 2,892,797 | A | 6/1959 | Alexander et al. |
| 3,007,878 | A | 11/1961 | Alexander et al. |
| 4,027,046 | A | 5/1977 | Bohm et al. |
| 5,603,805 | A | 2/1997 | Andersson et al. |
| 2004/0106697 | A1 | 6/2004 | Lortz et al. |
| 2006/0104881 | A1 | 5/2006 | Lortz et al. |

FOREIGN PATENT DOCUMENTS

| EP | 586846 | * | 7/1993 |
| EP | 0 656 872 B1 | | 6/1995 |
| WO | WO 00/20221 | | 4/2000 |

OTHER PUBLICATIONS

U.S. Appl. No. 11/571,441, filed Dec. 29, 2006 Lortz et al.

* cited by examiner

*Primary Examiner*—Anthony Weier
(74) *Attorney, Agent, or Firm*—Oblon, Spivak, McClelland, Maier & Neustadt, P.C.

(57) ABSTRACT

An aqueous dispersion, having a silicon dioxide powder having a silicon dioxide content of 10 to 60 wt.%, wherein the aqueous dispersion is stable in the pH range of 2 to 6, the aqueous dispersion additionally contains at least one compound, which is at least partially soluble in aqueous solution in the pH range 2 to 6 in the form of polyvalent cations, these being stable in a silicate-like environment as an anionic component of the particle surface of the silicon dioxide powder, the quantity of cation-providing compound in relation to the surface of the silicon dioxide is 0.001 to 0.1 mg cation-providing compound/$m^2$ silicon dioxide surface, the cation-providing compound being calculated as the oxide, and the zeta potential of the aqueous dispersion has values of less than or equal to zero.

12 Claims, 1 Drawing Sheet

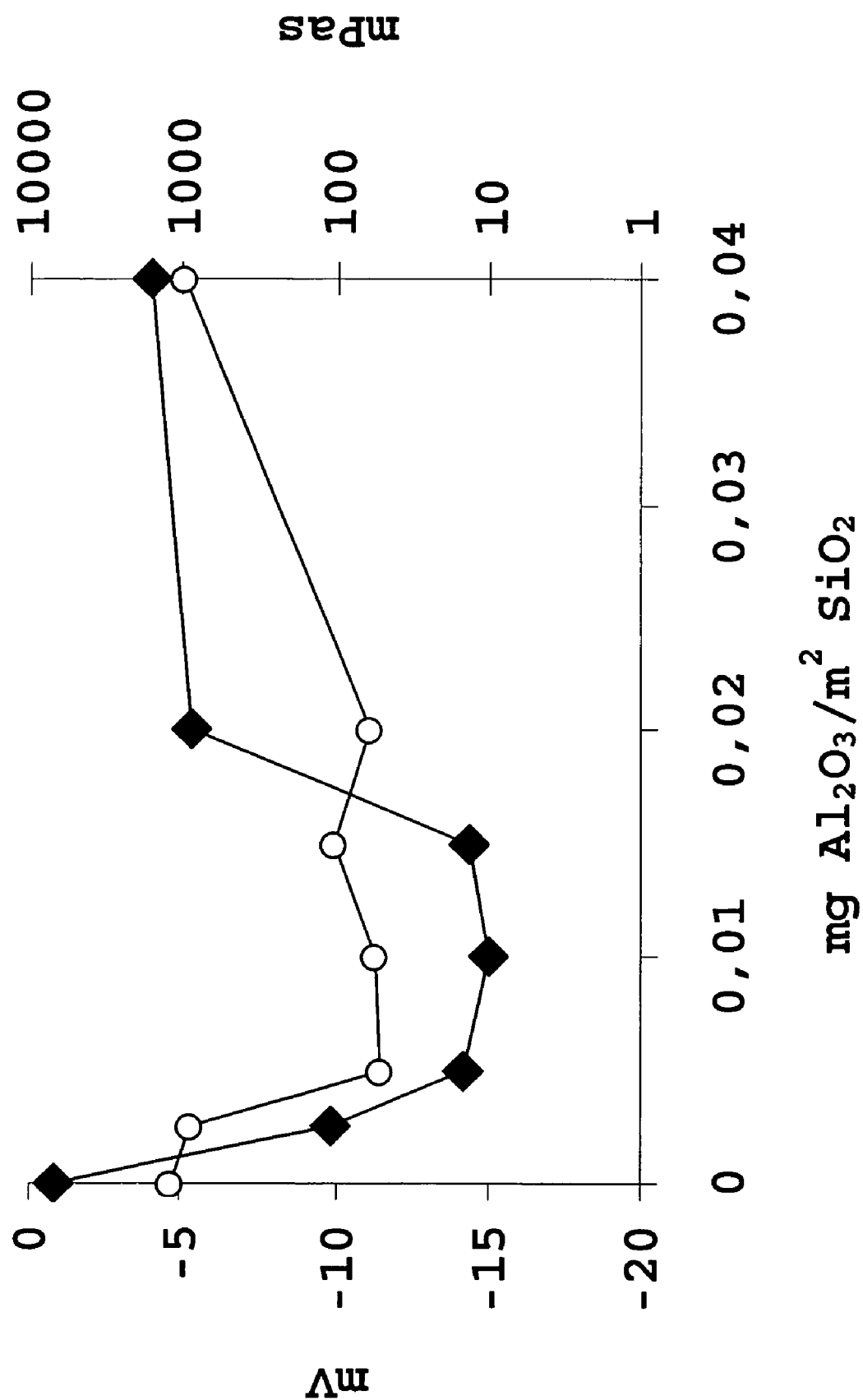

STABILIZED, AQUEOUS SILICON DIOXIDE DISPERSION

SUMMARY OF THE INVENTION

1. Field of the Invention

The invention relates to an aqueous dispersion containing silicon dioxide, which is stable in the acid pH range, its production and use. The invention further relates to a powder that can be used to produce the dispersion.

2. Description of the Background

Silicon dioxide dispersions are generally not stable in the acid pH range. A possibility for stabilizing such dispersions is offered, for example, by the addition of aluminum compounds to the dispersions.

WO 00/20221 discloses an aqueous silicon dioxide solution that is stable in the acid range. It is produced by bringing silicon dioxide particles into contact with aluminum compounds in an aqueous medium. The quantity of aluminum compound required to produce the dispersion claimed in the '221 application can be tracked by increasing the zeta potential and is achieved at the point where the rise in the zeta potential curve moves towards zero or a plateau is reached. The '221 application also claims dispersions in which the zeta potential achieves only 50% of the maximum achievable value. In every case, the zeta potential of the claimed dispersions has strongly positive values of up to 30 mV. This means that the originally negatively-charged silicon dioxide particles have been completely cationized by the addition of the aluminum compound. Although the claimed dispersion has good stability, it is no longer a silicon dioxide dispersion as the surface is covered with positively-charged aluminum species. This is a disadvantage in applications in which the dispersion is brought into contact with anionic substances or dispersions. This can lead, for example, to unwanted flocculation or sedimentation.

U.S. Pat. No. 2,892,797 on the other hand, discloses an aqueous silicon dioxide dispersion, which is stabilized by treatment with an alkali metalate. Sodium aluminate is preferred in particular. Stabilization takes place through the anion, for example $[Al(OH)_4]^-$. The dispersions are normally stable in a pH range of 5 to 9. The zeta potential of the powder thus treated is negative. The subsequent removal of the cation, by ion exchange processes for example, can be a disadvantage of this process. For special applications, such as, for example, chemical-mechanical polishing, alkali cations are generally undesirable. A further disadvantage is the low stability in more acid media below pH 5.

SUMMARY OF THE INVENTION

Accordingly, one object of the present invention is to provide a silicon dioxide dispersion that is stable in the acid range, without changing the properties of the silicon dioxide powder by reversing the charge on the particle surface.

Briefly, this object and other objects of the present invention as hereinafter will become more readily apparent can be attained by an aqueous dispersion comprising a silicon dioxide powder having a silicon dioxide content of 10 to 60 wt. %, wherein the dispersion is stable in a pH range of 2 to 6, the dispersion additionally contains at least one compound, which is at least partially soluble in aqueous solution in the pH range 2 to 6 in the form of polyvalent cations, the cations being stable in a silicate-like environment as an anionic component of the particle surface of the silicon dioxide powder, the quantity of cation-providing compound in relation to the surface of the silicon dioxide is 0.001 to 0.1 mg cation-providing compound/m² silicon dioxide surface, the cation-providing compound being calculated as its oxide, and the zeta potential of the dispersion has values of less than or equal to zero.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows the zeta potential in mV (♦) and the viscosity in mPas (o) of Examples 1a-g as a function of mg $Al_2O_3/m^2$ $SiO_2$-surface.

DETAILED DESCRIPTION OF THE PREFERRED EMBODIMENTS

The zeta potential is the outwardly-active potential of the particles and represents a measure of the electrostatic interaction between individual particles. It plays a part in the stabilization of suspensions and in particular of dispersions containing dispersed, ultra-fine particles. The zeta potential can be determined, for example, by measuring the colloidal vibration current (CVI) of the dispersion or determining its electrophoretic mobility.

The cation-providing compounds of use in the invention are always understood to be those that are at least partially soluble in aqueous solution in the pH range 2 to 6 in the form of polyvalent cations, these cations being stable in a silicate-like environment as an anionic centre. The cation-providing compounds are those which contain Ca, Sr, Ba, Be, Mg, Zn, Mn, Ni, Co, Sn, Pb, Fe, Cr, Al, Sc, Ce, Ti and Zr as the cation.

A silicate-like environment is understood to mean that the cations of the above-mentioned metals are present in the form of metal-oxygen bonds with the silicon atoms of the silicon dioxide surface. They can also replace silicon atoms in the silicon dioxide structure.

An anionic component is understood to be a component, which does not change the negative charge of the surface of a silicon dioxide powder, measured as zeta potential, or which shifts it towards more negative values.

Stable is understood to mean that the particles of the silicon dioxide powder do not agglomerate further in the dispersion and the viscosity of the dispersion does not change or changes only slightly (increase in viscosity of less than 10%) within a period of at least one week.

Preferred cation-providing compounds are amphoteric compounds having Be, Zn, Al, Pb, Fe or Ti as the cation and mixtures of these compounds.

Amphoteric compounds are those that, at a given pH, act as a base in relation to a stronger acid and as an acid in relation to a stronger base.

Preferred cation-providing compounds include aluminum compounds, such as, for example, aluminum chloride, aluminum hydroxychlorides of the formula $Al(OH)_xCl$ in which x=2-8, aluminum chlorate, aluminum sulfate, aluminum nitrate, aluminum hydroxynitrates of the formula $Al(OH)_xNO_3$ in which x=2-8, aluminum acetate, alums such as aluminum potassium sulfate or aluminum ammonium sulfate, aluminum formiate, aluminum lactate, aluminum oxide, aluminum hydroxide acetate, aluminum isopropylate, aluminum hydroxide, aluminum silicates and mixtures thereof. Aluminum silicate can, for example, be Sipernat 820 A from Degussa AG, which is a fine-particle aluminum silicate containing ca 9.5 wt. % aluminum as $Al_2O_3$ and ca 8 wt. % sodium as $Na_2O$, or a sodium aluminum silicate in the form of a zeolite A.

There is no restriction on the type of silicon dioxide powder employed in the dispersion of the invention. Thus silicon dioxide powders produced by sol-gel processes, precipitation processes or pyrogenic processes can be used. The silicon dioxide powder can be a metal oxide powder completely or partially encased in silicon dioxide, provided that its zeta potential is equal to or less than zero in the pH range of 2 to 6.

Pyrogenically-produced silicon dioxide powder is preferred.

The term pyrogenically according to the invention is understood to mean the formation of silicon dioxide by flame hydrolysis of a compound or compounds containing silicon in the gas phase in a flame produced by the reaction of a combustion gas and an oxygen-containing gas, preferably air. Suitable silicon-containing compounds include, for example, silicon tetrachloride, methyltrichlorosilane, ethyltrichlorosilane, propyltrichlorosilane, dimethyldichlorosilane, alkoxysilanes and mixtures thereof. Silicon tetrachloride is preferred in particular. Suitable combustion gases include hydrogen, methane, ethane and propane. Hydrogen is particularly preferred. During flame hydrolysis, highly-disperse, non-porous primary particles are formed first, which grow together as the reaction progresses to form aggregates, which can further combine to form agglomerates. The surface of the pyrogenically-produced silicon dioxide particles has silanol groups (Si—OH) and siloxane groups (Si—O—Si).

Pyrogenically-produced silicon dioxide powders also include doped silicon dioxide powders and pyrogenically-produced silicon-metal mixed oxide powders, provided that their zeta potential is less than or equal to zero in the pH range of 2 to 6.

The production of doped powders is disclosed, for example, in DE-A-196 50 500. Typical doping components include, for example, aluminum, potassium, sodium or lithium. The content of the doping component is generally no greater than 1 wt. %.

Pyrogenically-produced mixed oxide powders are understood to mean those in which both precursors of the mixed oxide are hydrolyzed together in the flame. Typical mixed oxide powders are silicon-aluminum mixed oxides or silicon-titanium mixed oxides.

According to a particular embodiment, the ratio of the cation-providing compound to the surface of the silicon dioxide preferably ranges from 0.0025 to 0.04, and in particular 0.005 to 0.02 mg cation-providing compound/$m^2$ silicon dioxide surface.

The silicon dioxide surface corresponds to the specific surface area of the silicon dioxide powder determined according to DIN 66131. The BET specific surface area can range from 5 to 600 $m^2/g$, preferably from 30 to 400 $m^2/g$, most preferably from 50 to 300 $m^2/g$.

The pH value of the dispersion of the invention ranges from 2 to 6, preferably from 3 to 5.5. In particular, at a BET specific surface area of the silicon dioxide powder of up to 50 $m^2/g$, the pH can range from 3 to 4 and at a BET specific surface area of 50 to 100 $m^2/g$, the pH can range from 3.5 to 4.5. At a BET specific surface area of 100 to 200 $m^2/g$, the pH can range from 4 to 5 and at a BET specific surface area of more than 200 $m^2/g$, the pH can range from 4.5 to 5.5.

The pH value can, if necessary, be adjusted to the appropriate level using acids or bases. Preferred acids include hydrochloric acid, sulfuric acid, nitric acid or carboxylic acids, such as for example acetic acid, oxalic acid or citric acid. Preferred bases are alkali hydroxides, such as KOH or NaOH, ammonia, ammonium salts or amines. If necessary, buffer systems can be formed by adding salts.

According to a particular embodiment, at a shear energy of 1.28 $s^{-1}$, the viscosity of the dispersion of the invention can be at least 10% lower than the viscosity of a dispersion of the same composition, which does not, however, contain a cation-providing compound. The viscosity is preferably 25%, in particular 50%, lower than that of a dispersion of the same composition, which does not, however, contain a cation-providing compound.

According to a particular embodiment of the invention, the number of agglomerates over 1 μm in size in the dispersion of the invention can be at least 50% lower than the number of agglomerates in a dispersion of the same composition, which does not, however, contain a cation-providing compound. The number of agglomerates over 1 μm in size is preferably 75%, in particular 90%, lower than in a dispersion of the same composition, which does not, however, contain a cation-providing compound.

The dispersion of the invention can further contain preservatives. Suitable preservatives include, for example, benzylalcohol, mono(poly)hemiformal, tetramethylolacetylenediurea, formamide monomethylol, trimethylolurea, N-hydroxymethylformamide, 2-bromo-2-nitropropane-1,3-diol, 1,6-dihydroxy-2,5-dioxahexane, chloromethylisothiazolinone, orthophenylphenol, chloroacetamide, sodium benzoate, octylisothiazolone, propiconazol, iodopropinyl butylcarbamate, methoxycarbonyl aminobenzimidazole, 1,3,5-triazine derivatives, methylisothiazolinone, benzoisothiazolinone and mixtures thereof.

Another aspect of the invention is the provision of a process for the production of the dispersion of the invention, in which the silicon dioxide powder and at least one cation-providing compound in a quantity of 0.001 to 0.1 mg cation-providing compound/$m^2$ silicon dioxide surface are brought into contact in an agitated aqueous solution.

Bringing the above materials into contact with the agitated solution is understood to mean, for example, the bringing of these materials into contact with a stirred or dispersing solution. Suitable dispersing devices that bring about dissolution include, toothed gear disks, rotor-stator machines, ball mills and mechanically agitated ball mills, for example. Higher energy inputs are possible with a planetary kneader/mixer. However the effectiveness of this system depends on the mixture processed having a sufficiently high viscosity to incorporate the high shear energies required to disperse the particles. High-pressure homogenizers can be used to obtain aqueous dispersions with aggregate sizes in the dispersion of less than 200 nm.

With these devices at least two pre-dispersed suspension streams under high pressure are released into a receiving vessel through a nozzle. The two dispersion jets collide with each other exactly and the particles mill themselves. In another embodiment the pre-dispersion is also placed under high pressure, but the collision of the particles takes place against armoured areas of wall. The operation can be repeated as often as desired to obtain smaller particles.

The process for the production of the dispersion according to the invention can be conducted in such a way that the cation-providing compound, in solid form or as an aqueous solution, is added to an aqueous dispersion of silicon dioxide.

It can also be conducted in such a way that the silicon dioxide powder is added to an aqueous solution of the cation-providing compound at once or in portions.

Furthermore, it is possible to add the silicon dioxide powder and the cation-providing compound to the liquid dispersion phase at the same time, in portions or continuously.

In this case, "at the same time" is understood to mean that the silicon dioxide powder and the cation-providing compound can be pre-mixed in the form of a physical or chemical mixture.

The invention further provides a powder of this type, that contains at least one cation-providing compound and silicon dioxide powder, the content of cation-providing compound, calculated as oxide, being 0.001 to 0.1 mg cation-providing compound/m$^2$ silicon dioxide surface.

Impurities may also be present in the processing described which are introduced by way of the typical impurities found in the starting materials and impurities introduced during production. The impurity content should be less than 1 wt. %, and normally less than 0.1 wt. %.

The cation-providing compound is preferably an aluminum compound and the silicon dioxide is a pyrogenically-produced silicon dioxide powder.

The powder of the invention can be incorporated rapidly into aqueous media.

In the simplest case, it can be produced by physical mixing of silicon dioxide powder and at least one cation-providing compound. Here it is useful to use individual packages completely. Consequently it is not necessary to have present a homogeneous distribution of silicon dioxide and cation-providing compound.

The powder of the invention can also be obtained by spraying at least one compound that is soluble in the pH range of <6 or that provides cations by chemical reaction in the pH range <6 onto the silicon dioxide powder. The solution of the cation-providing compound can be sprayed thereon in heated mixers and dryers equipped with spray devices, either continuously or in batches. Suitable devices include, for example: plough mixers, disk- or fluidized bed dryers.

The solution of the cation-providing compound can be sprayed thereon with an ultrasound nozzle or atomized. The mixer can optionally also be heated.

Furthermore, the powder of the invention can be obtained by separating a cation-providing compound, for example aluminum chloride, from vapor in a fluidized bed or mixer.

The invention further provides the use of the dispersion of the invention for chemical-mechanical polishing of metal surfaces, in particular polishing of copper surfaces, for the production of ink-jet papers, for gel batteries, for clarifying/fining wine and fruit juices, for water-based dispersion paints to improve the suspension behavior of pigments and fillers and to increase scratch-resistance, to improve the stability and "blackness" of carbon black dispersions for ink-jet inks, to stabilize emulsions and dispersions in the field of biocides, as a reinforcing agent for natural latex and synthetic latexes, to produce latex/rubber articles such as gloves, condoms, infant soothers or foamed rubber, in the sol-gel field, to remove surface stickiness (anti-blocking), to achieve an anti-slip effect in paper and cardboard, to improve slip resistance, to produce optical fibers, to produce quartz glass.

It is surprising that a silicon dioxide dispersion brought into contact with a cation-providing compound has good stability in the acid range and at the same time the surface of the silicon dioxide particle retains, or even strengthens, its negative surface charge.

The mechanism of this stabilization has not yet been explained. However, it must differ from that disclosed in WO 00/20221. Here, the charge of silicon dioxide particles is completely reversed by positively-charged aluminum species, giving the particles a positively-charged shell.

The mechanism must also differ from that disclosed in U.S. Pat. No. 2,892,797. Here, a negatively-charged metalate ion is incorporated into the surface of a silicon dioxide particle. Although the particles thus changed, like the particles in the dispersion of the invention, have a negative surface charge, they have little stability in the acid pH range.

Having generally described this invention, a further understanding can be obtained by reference to certain specific examples which are provided hereinafter for purposes of illustration only and are not intended to be limiting unless otherwise specified.

EXAMPLES

Analysis Methods

The zeta potential is determined with a DT-1200 type device from Dispersion Technology Inc., by the CVI method.

The viscosity of the dispersions was determined with a Physica MCR 300 rotation rheometer and CC 27 measuring beaker, measurement taking place at shearing rates of 0.01 to 500 s$^{-1}$ and 23° C. The viscosity is given at a shearing rate of 1.28 s$^{-1}$. This shearing rate lies in a range in which structurally viscous effects have a clear impact.

The particle/agglomerate sizes were determined with Horiba LB 500 and LA 300 devices, or a Malvern Zetasizer 3000 Hsa.

Dispersal

The dispersion devices used were, for example, a Dispermat AE-3M type dissolver from VMA-GETZMANN with a dissolver disk diameter of 80 mm or an Ultra-Turrax T 50 type rotor/stator dispersing unit from IKA-WERKE with S50N-G45G dispersing tools. When using rotor-stator devices, the charge container is cooled to room temperature.

Dispersal can also be conducted with a high-energy mill. For charges containing 50 kg silicon dioxide powder each, a portion of the DI water is placed into a 60 liter special steel charge container. The corresponding quantity of Aerosil powder is sucked in using an Ystrahl Conti-TDS 3 dispersion and suction mixer and roughly pre-dispersed. During powder intake, a pH value of 3.5±0.3 is maintained by adding sodium hydroxide solution and aluminum chloride solution. After powder intake, dispersion is completed with the Conti TDS 3 (stator slit width of 4 mm) with a closed suction nozzle at maximum speed. Before rotor/stator dispersal the pH of the dispersion was set at 3.5 by adding more sodium hydroxide solution and this remained the same after dispersing for 15 minutes. By adding the remaining quantity of water, an SiO$_2$ concentration of 20 wt. % was set. This pre-dispersion is milled in an HJP-25050 Ultimaizer System high-energy mill from Sugino Machine Ltd., at a pressure of 250 Mpa and a diamond nozzle diameter of 0.3 mm and two passes through the mill.

Chemicals

The aerosil types 50, 90, 200 and 300 from Degussa AG were used as the silicon dioxide powder. AlCl$_3$ in the form of the hexahydrate was used as the water-soluble aluminum compound. A 1 wt. % solution, in relation to $Al_2O_3$, was used to simplify dosing and homogenization. A 1 N NaOH solution or a 1 N HCL solution was used to correct the pH.

To allow comparisons between the viscosity of the dispersions, a uniform pH value of 3.5 is optionally set by adding further 1 N NaOH solution.

Dispersions

The various charge sizes and the properties of the dispersions obtained are presented in Tables 1 and 2.

Example 1a

Reference Example

A 100 g amount of Aerosil 50 (BET specific surface area ca 50 $m^2/g$) was incorporated in portions into 385 g DI water using a dissolver at a setting of ca 1800 rpm. This processing resulted in a dispersion having a pH value of 3.5. The remaining amount of 15 g DI water was then added to achieve a 20 percent dispersion and this was then dispersed for 15 minutes at 2000 rpm and 15 minutes using an Ultra Turrax at ca 5000 rpm.

Examples 1b-g

A 100 g amount of Aerosil 50 was incorporated in portions into 385 g DI water and 1.25 g of a 1 wt. % aqueous aluminum chloride solution (in relation to aluminum oxide), using a dissolver at a setting of ca 1800 rpm. This dispersion had a pH of 3.4, which was adjusted to pH 3.5 by adding 0.7 g 1N NaOH thereto. The remaining 13.1 g water were then added to achieve a 20 wt. % dispersion and this was then further dispersed for 15 minutes at 2000 rpm and 15 minutes with an Ultra Turrax at ca 5000 rpm.

Examples 1c-g were conducted in the same way as 1b.

Example 2a

Reference Example

A 100 g amount of Aerosil 90 was incorporated in portions into 370 g DI water using a dissolver at a setting of ca 1800 rpm. The material was then further dispersed for 15 minutes at 2000 rpm. The pH value was then adjusted to 3.5 using 1N HCl and the dispersion was dispersed for 15 minutes with an Ultra Turrax at ca 5000 rpm. The remaining water was added to achieve a 20 wt. % dispersion and the pH value was re-adjusted to 3.5.

Example 2b

A 100 g amount of Aerosil 90 was incorporated alternately, in portions, into 370 g DI water using a dissolver at a setting of ca 1800 rpm and then dispersed at a setting of ca 2000 rpm. 2.50 g of a 1 wt. % solution (in relation to aluminum oxide) of aluminum chloride were then added while being dispersed using an Ultra Turrax at ca 5000 rpm for 15 minutes. 26.3 g DI water and 1.24 g 1N NaOH were then added to obtain a 20 wt. % dispersion with a pH value of 3.5.

Example 3a

Reference Example

A 250 g amount of DI water and 20 g of a 1 wt. % aqueous aluminum chloride solution (in relation to aluminum oxide) was provided. Aerosil 90 was added in portions using a dissolver. The pH value was maintained at 3.5 during this process. After adding ca 40 g Aerosil 90 powder, the dispersion thickened very strongly making further additions impossible.

Examples 3b,3c

A 100 g amount of Aerosil 90 was incorporated into 250 g DI water using a dissolver and 10 g of a 1 wt. % aqueous aluminum chloride solution (in relation to aluminum oxide) and 1N NaOH were added alternately in portions so that the pH value was 3.3 to 4.2. A further 100 g Aerosil 90 and a further 10 g of a 1 wt. % aluminum chloride solution (in relation to aluminum oxide) and sufficient 1N NaOH were then added alternately in portions using an Ultra-Turrax at 5000 rpm to produce a pH value of 3.5 at the end of addition.

In example 3c a pH value of 4.0 was set.

Example 4

Reference Example

A 50 g amount of Aerosil 90 was incorporated in portions into 350 g DI water using a dissolver at a setting of ca 1800 rpm and then further dispersed for 15 minutes at 2000 rpm. A 100 g amount of a 1 wt. % solution (in relation to aluminum oxide) of aluminum chloride was then added and the mixture was further dispersed in an Ultra Turrax at ca 5000 rpm a for 15 minutes. The pH of 2 of the dispersion was increased to 3.5 using 30% sodium hydroxide solution.

Examples 5

Example 5a was conducted in the same way as 2a. Examples 5b-d were conducted in the same way as 2b. For examples 5e-g, ca 100 ml of the dispersion of example 5d was brought up to the pH value given in Table 2 with 30% sodium hydroxide solution added drop-wise, homogenized for ca 5 minutes with a magnetic stirrer and the zeta potential of each was measured.

Examples 6

Example 6a was conducted in the same way as 2a. Examples 6b-d were conducted in the same way as 2b.

FIG. 1 shows the zeta potential in mV (♦) and the viscosity in mPas (o) of examples 1a-g as a function of mg $Al_2O_3/m^2$ $SiO_2$-surface.

Example 7

Powder Production

A 500 g amount of silicon dioxide powder (Aerosil 200, Degussa) was added to a 20 l Lodige mixer. A 20 g amount of a 5 wt. % (in relation to $Al_2O_3$) aluminum chloride solution with a spray output of ca 100 ml/h was applied at a speed of 250 rpm within 10-15 min. The powder has 0.01 mg $Al_2O_3/m^2$ silicon dioxide surface, a BET specific surface area of 202 $m^2/g$ and a tamped density of ca 60 g/l. The water content is ca 4% and can, if desired, be reduced by heating the wiper or by subsequent drying in a drying cabinet, a revolving tube or a fluidized bed. An aqueous dispersion (20 wt.-%) has a pH value of 2.6.

TABLE 1

Aqueous Aerosil dispersions[1]

| Example | BET $SiO_2$ [m2/g] | $Al_2O_3$[2] [mg] | DI-$H_2O$ provided [g] | Total DI-$H_2O$ [g] | 1N NaOH [g] |
|---|---|---|---|---|---|
| 1a | 50 | 0 | 375 | 400 | — |
| 1b | 50 | 12.5 | 375 | 398.1 | 0.7 |
| 1c | 50 | 25 | 375 | 395.8 | 1.7 |
| 1d | 50 | 50 | 375 | 393.1 | 1.9 |
| 1e | 50 | 75 | 375 | 389.1 | 2.0 |
| 1f | 50 | 100 | 375 | 387.9 | 2.1 |
| 1g | 50 | 200 | 375 | 376.8 | 2.5 |
| 2a | 90 | 0 | 370 | 399.8 | 0.2[3] |
| 2b | 90 | 25 | 370 | 396.3 | 1.2 |
| 2c | 90 | 100 | 370 | 385.0 | 5.0 |
| 2d | 90 | 200 | 370 | 370.9 | 9.1 |
| 3a | 90 | 200 | 250 | — | — |
| 3b | 90 | 200 | 250 | 268.8 | 11.2 |
| 3c | 90 | 200 | 250 | 268.3 | 11.7 |
| 4 | 90 | 1000 | 350 | — | 7[4] |
| 5a | 200 | 0 | 360 | 399.9 | 0.1[3] |
| 5b | 200 | 25 | 360 | 396.0 | 1.5 |
| 5c | 200 | 100 | 360 | 382.9 | 7.1 |
| 5d | 200 | 200 | 360 | 367.2 | 12.8 |
| 5e | 200 | 200 | 360 | 367.2 | 12.5[5] |
| 5f | 200 | 200 | 360 | 367.2 | 12.5[5] |
| 5g | 200 | 200 | 360 | 367.2 | 12.5[5] |
| 6a | 300 | 0 | 330 | 399.8 | 0.2[3] |
| 6b | 300 | 200 | 330 | 368.6 | 11.4 |
| 6c | 300 | 300 | 330 | 352.0 | 18.0 |
| 6d | 300 | 400 | 330 | 331.2 | 28.8 |

[1] in all trials 100 g $SiO_2$ each, except 3: 200 g and 4: 50 g; Ex. 1: Aerosil 50, Ex. 2, 3, 4: Aerosil 90, Ex. 5: Aerosil 200, Ex. 6: Aerosil 300, all Degussa AG;
[2] $Al_2O_3$ used as $AlCl_3$;
[3] 1N HCl instead of 1N NaOH;
[4] 30% sodium hydroxide solution;
[5] additionally a few drops of 30% sodium hydroxide solution to achieve the corresponding pH value in Table 2.

TABLE 2

Analytical data of the dispersions[1]

| Example | $SiO_2$ Content [wt. %] | $Al_2O_3/SiO_2$ [mg/m$^2$] | pH of Dispersion | Zeta-Potential [mV] | Viscosity[2] [mPas] |
|---|---|---|---|---|---|
| 1a | 20 | 0 | 3.6 | −0.8 | 1142 |
| 1b | 20 | 0.0025 | 3.5 | −9.8 | 846 |
| 1c | 20 | 0.0050 | 3.4 | −14.2 | 50 |
| 1d | 20 | 0.0100 | 3.3 | −15.0 | 55 |
| 1e | 20 | 0.0150 | 3.4 | −14.4 | 104 |
| 1f | 20 | 0.0200 | 3.0 | −5.3 | 60 |
| 1g | 20 | 0.0400 | 3.1 | −3.9 | 970 |
| 2a | 20 | 0 | 3.3 | −0.5 | 246 |
| 2b | 20 | 0.0028 | 3.2 | −10.0 | 95 |
| 2c | 20 | 0.0111 | 3.1 | −9.9 | 40 |
| 2d | 20 | 0.0222 | 3.0 | −6.5 | 82 |
| 3a | [3] | 0.0111 | — | — | — |
| 3b | 40 | 0.0111 | 3.2 | −11.4 | 205 |
| 3c | 40 | 0.0111 | 4.0 | −13.3 | n.d.[4] |
| 4 | 10 | 0.222 | 3.3 | +25 | n.d. |
| 5a | 20 | 0 | 3.53 | −0.43 | [5] |
| 5b | 20 | 0.0013 | 3.4 | −4.1 | 1080 |
| 5c | 20 | 0.0050 | 3.0 | −6.2 | 672 |
| 5d | 20 | 0.0100 | 3.1 | −6.3 | 864 |
| 5e | 20 | 0.0100 | 3.4 | −7.75 | n.d. |
| 5f | 20 | 0.0100 | 5.0 | −9.5 | n.d. |
| 5g | 20 | 0.0100 | 6.0 | −11.3 | n.d. |
| 6a | 20 | 0 | — | — | [5] |
| 6b | 20 | 0.0067 | 3.3 | −6.6 | 1520 |
| 6c | 20 | 0.0100 | 3.3 | −6.7 | 537 |
| 6d | 20 | 0.0133 | 3.4 | −5.2 | 1160 |

[1] measured after one week;
[2] shearing rate of 1.28 s$^{-1}$;
[3] no 40 percent dispersion could be produced;
[4] n.d. = not determined;
[5] dispersion gelled The disclosure of U.S. provisional application Serial No. 60/405,739 filed Aug. 22, 2002 is hereby incorporated by reference into the present application.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by Letters Patent is:

1. A product aqueous dispersion, comprising:
   a silicon powder having a silicon dioxide content of 10 to 60 wt. %, wherein the aqueous dispersion is stable in the pH range of 2 to 6,
   the aqueous dispersion additionally contains at least one compound, which is at least partially soluble in aqueous solution in the pH range of 2 to 6 in the form of polyvalent cations, these being stable in a silicate-like environment as an anionic component of the particle surface of the silicon dioxide powder,
   the quantity of cation-providing compound in relation to the surface of the silicon dioxide is 0.001 to 0.1 mg cation-providing compound/m$^2$ silicon dioxide surface, the cation-providing compound being calculated as the oxide, and
   the zeta potential of the aqueous dispersion has values of less than or equal to zero, whereby the surface of the $SiO_2$ particles after treatment with the cation-providing compound retains its negative charge.

2. The aqueous dispersion as claimed in claim 1, wherein the cation-providing compound is an amphoteric compound having Be, Zn, Al, Pb, Fe or Ti as its cation, and mixtures of these compounds.

3. The aqueous dispersion as claimed in claim 2, wherein the amphoteric compound is an aluminum compound.

4. The aqueous dispersion as claimed in claim 1, wherein the silicon dioxide powder is a pyrogenically-produced silicon dioxide powder.

5. The aqueous dispersion as claimed in claim 4, wherein the BET specific surface area ranges from 5 to 600 m$^2$/g.

6. The aqueous dispersion as claimed in claim 1, wherein the pH value ranges from 3 to 5.

7. The aqueous dispersion as claimed in claim 1, wherein the pH of the dispersion is adjusted by the addition of acid or base thereto.

8. The aqueous dispersion as claimed in claim 7, wherein the acid is hydrochloric acid, sulfuric acid, nitric acid or a $C_1$-$C_4$-carboxylic acid and said base is an alkali hydroxide, ammonia, an ammonium salt or an amine.

9. The aqueous dispersion as claimed in claim 1, wherein the viscosity at a shear energy of 1.28s$^{-1}$ is at least 10% lower than the viscosity of a dispersion of the same composition that contains no cation-providing compound.

10. The aqueous dispersion as claimed in claim 1, wherein the number of agglomerates with a size greater than 1 µm is at least 50% lower than that of a dispersion of the same composition that contains no cation-providing compound.

11. The aqueous dispersion as claimed in claim 1, wherein the average secondary particle size of the silicon dioxide powder is less than 200 nm.

12. The aqueous dispersion as claimed in claim 1, wherein the dispersion contains a preservative.

* * * * *